United States Patent [19]

Atkins

[11] 4,085,254

[45] Apr. 18, 1978

[54] BIOLOGICAL APPARATUS FOR GENERATING ELECTRICAL POWER AND PROCESS FOR PRODUCING BACTERIA ELECTROLYTE

[75] Inventor: Lyle D. Atkins, Houston, Tex.

[73] Assignee: Biolec Corporation, Houston, Tex.

[21] Appl. No.: 625,866

[22] Filed: Oct. 28, 1975

Related U.S. Application Data

[63] Continuation of Ser. No. 415,324, Nov. 13, 1973, abandoned.

[51] Int. Cl.² .............................................. H01M 8/16
[52] U.S. Cl. ....................................................... 429/2
[58] Field of Search .................. 195/1, 27, 104; 429/2

[56] References Cited

U.S. PATENT DOCUMENTS

| | | | |
|---|---|---|---|
| 1,611,531 | 12/1926 | Kahn | 195/27 |
| 3,228,799 | 1/1966 | Rohrback | 429/2 |
| 3,331,705 | 7/1967 | Davis | 429/2 |
| 3,336,161 | 8/1967 | Sutton et al. | 429/2 |

*Primary Examiner*—Donald L. Walton
*Assistant Examiner*—H. A. Feeley
*Attorney, Agent, or Firm*—Bard, Springs, Jackson & Groves

[57] ABSTRACT

In one exemplar embodiment, a biological source of electrical power is provided. The electrical power source comprises a pair of electrodes formed of elements having differing electromotive force. Interposed between the electrodes and in contact with them is an electrolytic material comprising an aqueous brine solution containing coexistent aerobic and anaerobic bacteria derived from a marine organism source mixed with a bacteria nutrient and filler composed of a finely divided cellulose material. All of the aqueous brine solution containing the bacteria is absorbed and carried by the finely divided cellulose material insuring that no free liquid remains. The aqueous brine solution containing the bacteria acts as the electrolyte for the power source and when an external load is applied to the terminals a usable voltage and current are produced.

14 Claims, 5 Drawing Figures

U.S. Patent  April 18, 1978  4,085,254
FIG. 1
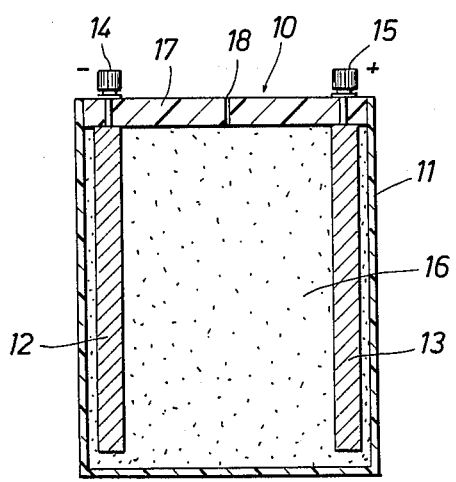
FIG. 2
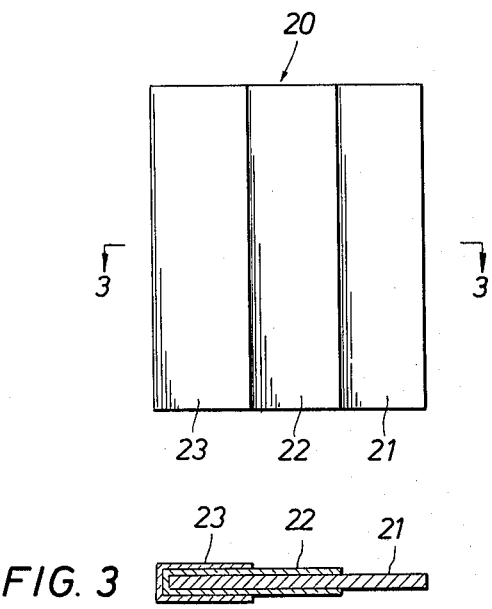
FIG. 3
FIG. 4
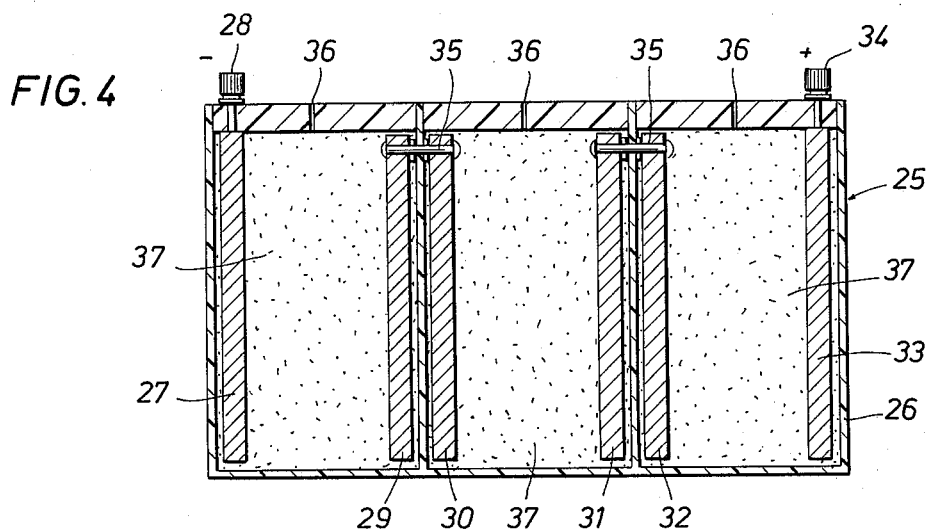
FIG. 5
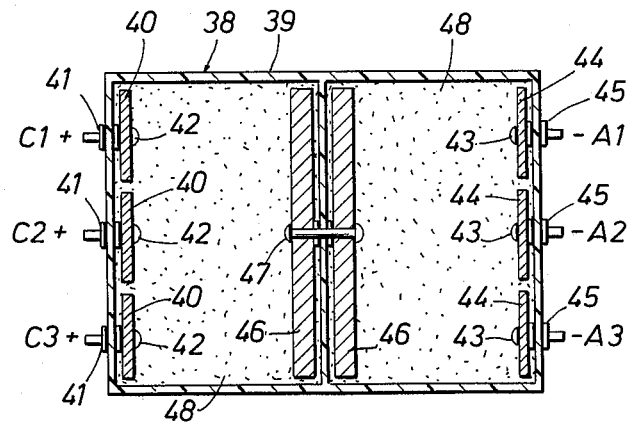

BIOLOGICAL APPARATUS FOR GENERATING ELECTRICAL POWER AND PROCESS FOR PRODUCING BACTERIA ELECTROLYTE

This is a continuation, of application Ser. No. 415,324 filed Nov. 13, 1973 now abandoned.

BACKGROUND OF THE INVENTION

This invention relates to the biological generation of electrical power and, more specifically, relates to an apparatus for generating electrical energy using biological processes of living organisms.

The electro-chemical generation of power is well known in the prior art. It is also known that biological processes of living organisms can be utilized to enhance the generation of electrical power. In the patent to Rohrback, U.S. Pat. No. 3,228,799, issued in 1966, an apparatus or battery for producing electrical power is disclosed utilizing two electrodes of differing electromotive force and an electrolyte, namely sea water, having living organisms that act as "depolarizers" of half cell reactions of an electro-chemical power cell or act to directly catalyze the half cell reaction of the electro-chemical power cell.

Other electro-chemical cells utilizing the biological processes of bacteria or living organisms are shown in the prior art, but almost all of them utilize a free liquid electrolyte in conjunction with the electrodes to generate electrical power. Some devices use permeable membranes to control ion exchange in the liquid electrolyte, while others have elaborate means to continuously introduce new bacteria, circulate the electrolyte, provide a continuous nutrient supply to the liquid electrolyte means to control and isolate the bacteria colony or to promote the growth of the bacteria colony on the electrodes. One "dry" biochemical battery is disclosed in U.S. Pat. No. 3,403,053 which utilizes the electro-chemical process of enzymatic-action of selected enzymes upon bioligical materials. But liquid is utilized in the form of a saturated pad which must be resaturated periodically with a defined chemical electrolyte.

However, all of the prior art devices and processes have been laboratory curiosities that have generated measurable electrical power but because of their complexity, size, use of a free-liquid electrolyte, limitations on power generation, and longevity of the cell have not been able to compete with standard dry cell batteries, which are another form of electro-chemical power sources. In the 1960's, applicant built and marketed a quantity of electro-chemical power cells having a pair of electrodes and an electrolytic material comprising an electrolyte solution containing bacteria derived from common manure and a bacteria nutrient and filler composed of finely divided cellulose materials, such as rice hulls, for absorbing and carrying all of the solution containing the bacteria insuring that no free liquid remained. The electrolytic material was interposed in the cell between the electrodes and in contact with the surface area of the electrodes. A cell approximately three inches in height and two inches in diameter was able to generate 0.6 volts and 5 milliamperes. However, the bacteria apparently were short lived, and the cell could operate only for 30 to 60 days before showing a marked decrease in ability to generate power. Then more bacteria and moisture had to be added to maintain the cell power output.

Accordingly, one primary feature of the present invention is to provide an improved biochemical electrical power source that is basically "dry" in that it contains no free liquid and would not be subject to the shortcomings of leakage of electrolyte.

Another feature of the present invention is to provide an improved electrolyte containing coexistent aerobic and anerobic bacteria derived from a marine organism source that is extremely long lived, hardy under extremes of temperature, and will significantly prolong power cell life.

Yet another feature of the present invention is to provide an improved biochemical electrical power source that will produce a voltage equivalent to a dry cell battery of approximately equal structural dimensions but which have a significantly greater current producing capacity for prolonged periods of time greatly in excess of a dry cell battery.

Still another feature of the present invention is to provide an improved biochemical electrical power source that is self-contained and will operate for extended periods of time without addition of bacteria, nutrient or moisture.

Another feature of the present invention is to provide an improved biochemical electrical power source that will provide economical electrical power for portable power requirements for extended periods of time without degradation.

SUMMARY OF THE INVENTION

The present invention remedies the problems of the prior art by providing an improved bacteria-energized source of electric power that has a pair of electrodes, the electrode functioning as the anode being formed of at least one element having a relatively high electromotive force, and the electrode functioning as the cathode being formed of at least one element having a relatively low electromotive force. Interposed between the spaced electrodes and in contact with the surface area of the electrodes is an electrolytic material having no free liquid that is composed of a mixture of an aqueous brine solution containing coexistent aerobic and anerobic bacteria derived from a marine organism source, preferably fish, and a bacteria nutrient and filler composed of a finely divided cellulose material, preferably rice hulls, that absorbs and carries all of the aqueous brine solution and bacteria. It is possible to provide multiple electrodes for both anode and cathode that will provide a multiple source of power from the same cell.

An improved electrolyte for use in such a power source is provided by processing a mixture of at least a portion of a marine animal and salt water at a predetermined temperature for a predetermined period of time, and extracting from the processed mixture the resultant aqueous brine solution containing coexistent aerobic and anerobic bacteria. The aqueous brine solution containing the bacteria can also be subjected to environmental extremes to eliminate all but the hardiest bacteria by cooling the processed mixture, prior to the extracting step, to ambient temperature and subjecting the mixture to a predetermined pressure. After extraction the solution can then be subjected to a second predetermined temperature for a predetermined time period.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope, for the invention may admit to further equally effective embodiments.

In the drawings:

FIG. 1 is a vertical cross-sectional view of an electrical power source according to this invention.

FIG. 2 is a side view of multi-element electrode suitable for use with the invention.

FIG. 3 is a horizontal cross-sectional view of the multi-element electrode as taken along ines 3—3 of FIG. 2.

FIG. 4 is a vertical cross-sectional view of an electrical power source having multiple cells connected in series.

FIG. 5 is a horizontal cross-sectional view of yet another multi-cell electrical power source.

DETAILED DESCRIPTION OF THE PREFERRED EMBODIMENTS

THE BACTERIA-ENERGIZED ELECTRIC POWER SOURCE

Referring now to FIG. 1, an electric power source or current cell 10 is shown having a housing 11 constructed of a suitable insulating material such as plastic, rubber, glass, ceramic or other like materials, or the housing could also be constructed of a suitable metal that is coated with an insulating material. Two electrodes 12 and 13 are disposed in the housing and have conventional connecting terminals 14 and 15, respectively, for connecting the current cell to a suitable load.

An electrolytic material 16 is interposed between the electrodes 12 and 13 within the housing 11 and contacts the electrodes over substantially all of the electrode surface. The electrolytic material is comprised of a finely divided cellulose material carrying an aqueous brine solution containing aerobic and anerobic nitrogen-fixation bacteria derived from a marine organism source. The finely divided cellulose material acts as a nutrient for the bacteria contained in the aqueous brine solution and also acts as a carrier for the electrolyte to dispose and distribute the electrolyte throughout the cell and between the electrodes 12 and 13.

The top of the housing is sealed with a suitable sealing material 17 having insulating properties, and a vent 18 is provided to allow gas generated by the bacteria to escape from the interior of the cell. A suitable evaporation inhibiting compound or means is also mixed with the aqueous brine solution and the finely divided cellulose material that make up the electrolytic mterial 16 for inhibiting the evaporation of moisture from the cellulose material. This compound may conveniently be glycerine or a like material compatible with the bacteria. The cellulose material is preferably finely divided or powdered rice hulls, but it may be other types of cellulose material such as sawdust or shredded corn cobs.

An additional nutrient for the bacteria may also be added to the electrolytic material 16 comprising a mixture of urea, ammonium sulphate, organic kelp and lignite. It is preferably to use an ammonium sulphate having at least a 21% nitrogen content and kelp that is 100% organic. It has been found that a lignite that is at least 75% organic is also preferable. The additional nutrient described above is not necessary to the working of the cell; however, it does enhance the operation of the cell somewhat and provides the bacteria with a longer lasting and more active nutrient for long operation.

The aerobic and anerobic nitrogen-fixation bacteria that is utilized are derived from marine organism sources, preferably from such aquatic verterbrates such as fish. This bacteria has been found to be extremely hardy and long-lived. The bacteria need moisture for their life cycle, but the moisture content of the electrolytic material has been found to be preferably about 20–30%.

The electrodes 12 and 13 may be composed of various materials. The negative electrode 12 or anode is preferably composed of at least one element having high electromotive force, such elements typically being aluminum, zinc, steel or alloys such as a homogeneous alloy of zinc and lead, commonly sold under the trademark Chemalloy, and an alloy of nickel, copper and usually iron and manganese made by direct reduction from ores, commonly sold under the trademark Monel Metal. The positive electrode 13 or cathode may be composed of an element having a relatively low electromotive force, such materials commonly being copper, brass, bronze, and even a non-metal such as carbon. It has been found helpful to dip the electrodes in phosphoric acid prior to assembly in order to retard the oxidation of the electrode material and enhance its life.

A cell constructed similar to that in FIG. 1 and having aluminum and copper electrodes exhibited an open circuit voltage of 0.6 volts with a short circuit current of 9 milliamps. Such a cell can be built to have dimensions of 3 inches in height and 2 inches in diameter. A cell built in accordance with the embodiment of FIG. 1 has been in continuous operation under load for as long as seven months without any significant decrease in output.

A special anode electrode 20 is shown in FIGS. 2 and 3. This anode electrode is composed of an aluminum or steel member 21, having two-thirds of its surface area coated with a zinc coating 22. One-half of the zinc coating 22 is then coated with a coating of a homogeneous alloy of zinc and lead (Chemalloy). Such a three-part anode electrode 20 is known to enhance the output of the cell appreciably. A cell shown in FIG. 1, when properly constructed and utilizing an anode electrode 20, has exhibited an open circuit voltage of 1.2 volts and a short circuit current of 250 milliamps.

It has been found that increasing the surface area of electrodes 12 and 13 materially enhances the current output of the cell. However, there does appear to be a limit of increased surface area that does enhance cell operation. This limit occurs at 64 square inches of electrode surface area. Above this limiting size, increased size of the electrodes does not enhance the current output of the cell appreciably. It is believed that the reason for this limiting factor is that as the electrode size increases the internal resistance increases, and that above 64 square inches of surface area the internal resistance is so large that it limits further enhancement of the current output of the cell.

Referring now to FIG. 4, an electric power source 25 having multiple cells is shown. The housing 26 is preferably constructed of an insulating material as hereinabove described with regard to the embodiment shown in FIG. 1, and the interior of the housing is divided into a plurality of cells by upstanding walls. Within each cell are disposed a pair of electrodes 27-29, 30-31 and 31-33. Electrodes 27 and 33 have projecting connecting terminals 28 and 34, respectively, for attaching the electric power source 26 to a suitable external load. Electrodes 29 and 30, and 31 and 32, are electrically connected by means of a structural connector 35 that projects through the housing wall and electrically connects the two electrodes. Connector 35 may commonly be a metal screw, a rivet, or other conventional connecting means that has electrical conducting properties. The interior of the cells is filled with an electrolytic material 37 having the properties hereinbefore mentioned.

It may be seen that the plurality of cells shown in electrical power source 25 are connected in series, thereby enhancing the voltage and current output of the power source A 12-cell power source constructed in accordance with the embodiment shown in FIG. 4 has produced an open circuit voltage of 14.4 volts and a current output of 500 milliamps. The electrical power sources 25 described above have been able to produce and sustain the power outputs described over extremely long periods of time, greatly exceeding the normal lifetime of a dry cell battery.

FIG. 5 discloses yet a third embodiment of an electric power source 38, having multiple connections for operating multiple loads from the same cell. Source 38 has a housing 39 constructed of insulating material as hereinbefore described for the previous embodiments. The source 38 is divided into a plurality of cells by dividing walls. One cell contains a plurality of electrodes 40 spaced apart within the cell and connected to terminal 41 on the external surface of the housing 39. The electrode 40 and the terminal 41 are connected by a conventional structural connector 42 having electrical conducting properties. A plurality of electrodes 44 are being connected to external terminals 45 by means of structural connectors 43, as hereinbefore described for electrodes 40. The cells also contain electrodes 46 interconnected by means of a structural connector 47 having electrical conducting properties in order to connect the cells in a series arrangement. The interior of the cells is filled with the electrolytic material hereinabove described, that is interposed between the electrodes and in contact with each of the electrodes 40 and 46, and 44 and 46.

It is possible to connect an external load between terminals $C_1$ and $A_1$, a second external load between terminals $C_2$ and $A_2$, and a third external load between terminals $C_3$ and $A_3$. In this way multiple loads may be connected to the power source, with the open circuit voltage and short circuit current output from each of the terminal pairs being equal. The electrical output will be maintained regardless of whether one terminal pair is utilized with a load or whether all three are utilized simultaneously.

Unlike a dry cell battery, which has a limited current producing capacity and for which circuitry is designed to minimize current drain, the biological cell herein described has an enhanced current producing capacity and circuitry may be designed to take maximum effect of this feature. In fact, while shorting of the electrodes of a dry cell for a prolonged period destroys the cell, shorting of the above described cell does not affect its operation and is the preferred method of storage.

The above described electrical power source or biological cell can operate under load for months without adding additional moisture, bacteria nutrients or bacteria. Accordingly, it is extremely well suited to uses that demand long life such as portable lanterns, safety signals for highways, offshore platform and rig use, and other uses where repeated replacement of exhausted cells, such as conventional dry cells, would be an economic burden.

BACTERIA-ENERGIZED ELECTROLYTE AND PROCESS FOR PRODUCING THE ELECTROLYTE

The electrolytic material has been heretofore described as a combination of an aqueous brine solution containing coexistent aerobic and anerobic nitrogen-fixation bacteria derived from a marine organism source and a bacteria nutrient and filler composed of finely divided cellulose material for sustaining the bacteria and absorbing and carrying all of the aqueous brine solution for insuring that no free liquid remains. The bacteria nutrient and filler with the absorbed aqueous brine solution is interposed between and in contact with the electrodes of the power cell. An evaporation inhibiting compound or means is added to the material and is compatible with the bacteria for inhibiting evaporation of the aqueous brine solution. It has been found that finely shredded or powdered rice hulls make an excellent bacteria nutrient and filler material. But other high cellulose content materials can be used. The evaporation inhibiting compound preferably utilized is glycerine, but other compounds or ingredients may be utilized if compatible with the bacteria. Many bacteria strains will cooperate with an electrolyte solution to generate electrical power, but prior known bacteria have not been hardy enough to live for long periods of time in an electrical power source or biological cell atmosphere. Applicant has discovered a source of long-lived, hardy aerobic and anerobic bacteria that will coexist in the same medium that when used in a fuel cell enhances its voltage and current output and, of greatest significance, will prolong its life for periods heretofore unimagined.

It has been discovered that certain marine organisms, principally aquatic vertebrates, possess these bacteria that are recoverable in commercial quantities. Fish are the presently utilized source of the bacteria, but other marine organisms may possess the bacteria in recoverable quantities. In particular, it has been discovered that the stomachs and livers of fish, primarily salt water fish, possess these hardy bacteria that are useful in the electrolyte of a long-lived fuel cell.

The discovered process for producing an aqueous brine solution containing the coexistent aerobic and anerobic nitrogen-fixation bacteria has the following steps:

1. processing a mixture composed of fish stomachs and livers and salt water in a pressure cooling vessel at 25 p.s.i. at 240° F. for one hour;
2. cooling the processed mixture to ambient room temperature and subjecting the mixture to a vacuum equivalent to approximately 19 inches of mercury;
3. extracting from the processed mixture the resultant aqueous brine solution containing the coexistent aerobic and anerobic bacteria, and
4. subjecting the aqueous brine solution to a temperature of −20° F for a period of 72 hours.

When the aqueous brine solution has thawed to ambient temperature, it is ready to be used as a biological cell electrolyte. The solution extracted from the process contains an extremely high concentration of the bacteria, so high in fact that the bacteria are literally impossible to count as evidenced from lab tests. Accordingly, the solution is, in practice, diluted greatly before mixing with the bacteria nutrient and filler cellulose material. It has been found that 5 ounces of the extracted solution with bacteria, when added to 125 gallons of water, is of sufficient strength to treat approximately five tons of cellulose material, and is applied by spraying the solution on the material and thoroughly mixing the diluted aqueous solution with bacteria with the cellulose material to evenly distribute the solution and insure uniform absorption of the solution by the material to an aproximate 30% moisture content.

As hereinbefore mentioned, glycerine is added to inhibit evaporation of the solution and may be added to the solution when mixed with the cellulose material or added separately. It has been found that 5 ounces of glycerine per 125 gallons of water serves as an effective evaporation inhibitor.

It has been found that the optimum moisture content of the material-solution mixture is 20%–30%. If the moisture content falls below the stated range, it has an adverse effect on the bacteria and probably provides an insufficient ion exchange medium. The moisture content can be higher than the range above stated with no adverse effects but is not necessary for proper operation of the cell.

In the process above described, the recovered aerobic and anerobic nitrogen-fixation bacteria have not been specifically identified by the applicant since their exact identity is now unknown. It is believed that the processing step at the predetermined stated temperature acts to kill and eliminate many other undesirable forms and strains of bacteria and organisms, while only the strongest of the discovered aerobic and anerobic nitrogen-fixation bacteria survive in sufficient quantities for use.

The steps of subjecting the processed mixture to a vacuum and to freezing temperatures for a predetermined time period are not believed to be essential to recovery of the bacteria from the fish organs, but further subjects the bacteria to harsh and extreme environmental conditions for insuring that only the hardiest of the desired bacteria survive.

While fish stomachs and livers are described in the process, the whole fish carcass may be processed and the desired bacteria can be recovered. The proportion of fish stomachs and livers to salt water has been found to be conveniently 5 pounds of stomachs and livers to one gallon of salt water. This proportion of the processed mixture is not critical, however, and other proportions may be used. Instead of salt water, actual sea water may be utilized since it contains salt and also other trace elements and food upon which the extracted bacteria can thrive. Other organisms such as fungus and other strains of bacteria and chemical compounds may be present in the extracted aqueous brine solution, but it is believed that only the aerobic and anerobic nitrogen-fixation bacteria are responsible for the enhanced properties of the electrolyte containing the bacteria.

Numerous variations and modifications may obviously be made in the structure and processes herein described without departing from the present invention. Accordingly, it should be clearly understood that the forms of the invention herein described and shown in the figures of the accompanying drawings are illustrative only and are not intended to limit the scope of the invention.

What is claimed is:

1. A long-lived, self-contained, bacteria-energized source of electric power, including
   - a first electrode formed of at least one element of relatively high electromotive force,
   - a second electrode spaced from said first electrode and formed of a different element of relatively low electromotive force,
   - an electrolyte comprising an aqueous brine solution containing coexistent quantities of aerobic and anerobic bacteria derived from marine organisms, produced by the following process steps:
     - processing a mixture composed of fish stomachs, livers and salt water at 25 psi and 240° F. for one hour,
   - cooling said processed mixture to ambient temperature and subjecting said mixture to a pressure equivalent to 19 inches of mercury,
   - extracting from said processed mixture the resultant aqueous brine solution containing coexistent aerobic and anerobic bacteria, and
   - subjecting said aqueous brine solutio to a temperature of −20° F. for a period of 72 hours,
   - a bacteria nutrient and filler composed of finely divided cellulose material for sustaining said bacteria and absorbing and carrying all of said aqueous brine solution for insuring that no free liquid remains, said bacteria nutient and filler interposed between and in contact with said electrodes, and
   - evaporation inhibiting means intermixed with said bacterial nutrient and filler and aqueous brine solution and compatible with said bacteria for inhibiting evaporation of said aqueous brine solution.

2. The source of electric power described in claim 1, wherein said first electrode is composed of aluminum.

3. The source of electric power described in claim 1, wherein said first electrode is composed of steel.

4. The source of electric power described in claim 1, wherein said first electrode is comprised of a steel member, approximately two-thirds of the surface area of which is coated with zinc, and approximately one-half the surface of the zinc coating being coated with a homogeneous alloy of zinc and lead.

5. The source of electric power described in claim 1, wherein said second electrode is comprised of copper.

6. The source of electric power described in claim 1, wherein said marine organisms are fish.

7. The source of electric power described in claim 1, wherein said bacteria nutrient and filler comprise finely divided particles of rice hulls.

8. The source of electric power described in claim 1, wherein said evapoation inhibiting means comprises glycerine.

9. The source of electric power described in claim 1, wherein said first and second electrodes are coated with phosphoric acid to retard oxidation.

10. The source of electric power described in claim 1, wherein said aqueous brine solution also includes an additional bacteria nutrient comprising urea, ammonium sulphate, organic kelp and lignite.

11. In a bacteria-energized source of electric power characterized by having first and second electrodes and a bacteria-laden electrolyte material having no free liquid interposed between and in contact with said electrodes, said electrolytic material containing a bacteria nutrient and filler composed of finely divided cellulose material, the combination thereof with said bacteria nutrient and filler of a bacteria-laden electrolyte produced by the following process steps:

processing a mixture composed of fish stomachs, livers and salt water at 25 psi and 240° F. for one hour, cooling said processed mixture to ambient temperature and subjecting said mixture to a pressure equivalent to 19 inches of mercury, extracting from said processed mixture the resultant aqueous brine solution containing coexistent aerobic and anerobic bacteria, and subjecting said aqueous brine solution to a temperature of −20° F. for a period of 72 hours.

12. The source described in claim 11, further including an evaporation inhibiting compound intermixed with said bacteria nutrient and filler and the bacteria-laden electrolyte and compatible with said bacteria for inhibiting evaporation of said aqueous brine solution.

13. The source described in claim 12, wherein said evaporation inhibiting compound is glycerin.

14. The source described in claim 11, wherein said bacteria-laden electrolyte further includes an additional bacteria nutrient comprising urea, ammonium sulphate, organic kelp and lignite.

* * * * *